June 11, 1929.  J. CASTAGNA  1,716,718
CHUCK
Filed March 23, 1928
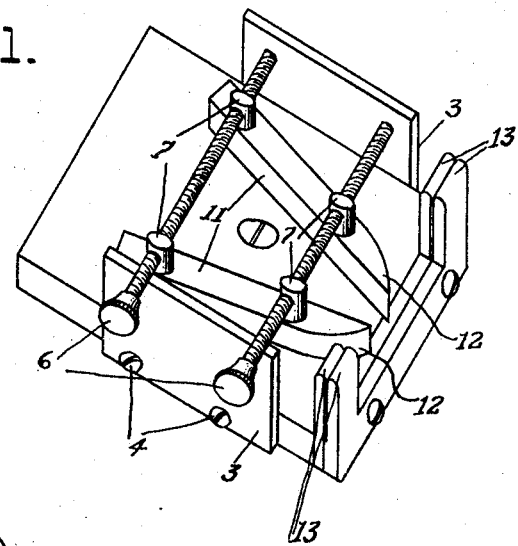
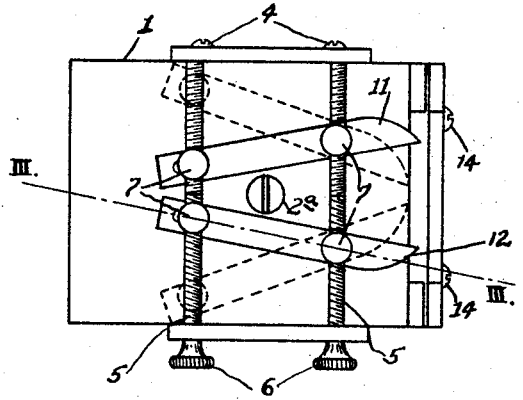
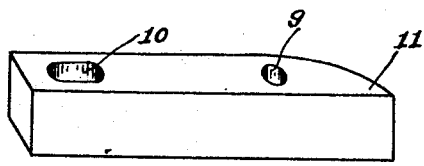
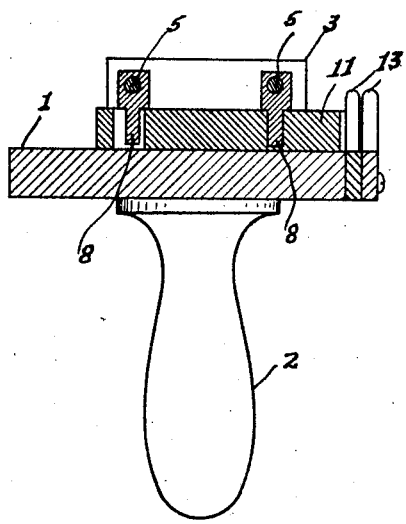
Inventor
Joseph Castagna
By his Attorney
Walter L. Bakelar Patented June 11, 1929.

1,716,718

UNITED STATES PATENT OFFICE.

JOSEPH CASTAGNA, OF BROOKLYN, NEW YORK.

CHUCK.

Application filed March 23, 1928. Serial No. 263,994.

This invention relates to improvements in chucks, and more particularly to chucks such as are used by jewelers for holding small articles which are to be cut to size, such as material used in the making of link-bracelets.

One of the objects of the invention is the provision of a chuck which will always retain the material to be cut exactly centered therein so that a straight cut may be obtained at all times.

A further object of the invention is the provision of a chuck which can be easily manipulated, without requiring the many adjustments which are necessary in devices in use at the present time.

A still further object of the invention is the provision of a chuck having guide members or jaws which are capable of pivotal and bodily movement on their supporting member thereby to accommodate work of different sizes and shapes.

In the drawings accompanying and forming part of this specification,

Figure 1 is a perspective view of my improved chuck;

Figure 2 is a top plan view thereof, showing in dotted lines the extent to which the guides or jaws may be opened at the rear end thereof;

Figure 3 is a sectional view taken on the line III—III of Figure 2; and

Figure 4 is a plan view of one of the guide members, showing the form of the openings therein.

Similar characters of reference indicate corresponding parts throughout the various figures of the drawings.

The chuck, as preferably constructed and as shown in the drawings, comprises a base portion 1 made of any suitable material, such as steel, having attached at the bottom thereof a handle 2 secured by a screw $2^a$, or the same may be screw-threadedly connected to said base. The base portion 1 is further provided at the sides thereof with metal plates 3 forming side walls attached thereto by the screws 4, although it will be understood that the base and side plates may be cast as an integral unit.

The plates 3 have holes therein to rotatably accommodate two-way screws 5, each of such screws being provided at one end thereof with a knurled nut 6, or any other suitable means, for manipulating the same. The screws 5 are threaded through cylindrical studs 7, the lower portions 8 of such studs being of substantially smaller diameter than the main portions thereof. The lower portions 8 of these studs 7 extend into openings or slots 9 and 10 provided in guide members or jaws 11, the opening 9 being preferably cylindrical while the opening 10 is made elongated as shown, in order that the same may take care of the play necessary when the guide members 11 are opened to their widest position as shown in dotted lines in Figure 2, such guides moving in the arc of a circle.

The front end 12 of each of the guide members 11 is tapered in order that the same may clear the saw guide 13 provided at the front end of the base 1, and thus permit same to be opened to the greatest extent possible. This saw guide 13 comprises upright members spaced a slight distance apart to accommodate a saw to be inserted therein for the cutting of the material. This guide member 13 is made of two separate pieces as shown in the drawings, although it will be understood that the base 1, side plates 3, and saw-guide members 13 may be formed as an integral unit.

In the operation of the invention, if it is desired to cut a piece of material having its width identical throughout the entire length thereof, the screws 5 are given exactly the same number of turns, and such screws being threaded right and left hand from the center thereof, the guides or jaws 11 will be moved exactly the same distance so that the material to be inserted will be exactly centered in the chuck. After the material is inserted, the screws are adjusted by means of the knurled nuts 6 to bring the jaws into abutting relation with the side edges of the material to firmly hold the same in place, whereupon the same is cut.

If it is desired to cut a piece of material which is tapered, the guides 11 are opened in a similar manner to the angle desired, the elongated slots 10 taking care of such play as may be necessary.

It will be readily seen that the opposite ends of the jaws 11 may be operated independently of each other,—that is to say, assuming the jaws are in their closed position, the screw for adjusting the rear ends is manipulated by the knurled nut 6 to the position as shown for instance by dotted lines in Figure 2. The front ends of the jaws may then be adjusted to the position desired, the rear ends remaining stationary and acting as pivots. This adjustment may, of course, be reversed, that is the front ends first opened and the rear ends then adjusted to the desired position. It will further be seen that the jaws 11 are bodily movable and may be adjusted to various angles for the accommodation of different shaped materials.

It will also be understood that the handle 2 is not absolutely necessary, inasmuch as the holder or chuck may be placed on a flat surface.

It will be further understood that various changes and modifications may be made in the details of construction without departing from the spirit or scope of the present invention.

I claim:

1. A chuck comprising in combination, a base having a pair of side members, a pair of jaws movable on said base, a pair of adjusting members mounted for rotation in said side members and each having a right hand threaded portion and a left hand threaded portion, each of said jaws having a pair of studs mounted for angular movement therein, the studs of the respective jaws being threaded on the right and left hand threaded portions of said adjusting members, and one of each pair of studs being movable longitudinally of its jaw.

2. A chuck comprising in combination, a base having a pair of side members, a pair of jaws movable on said base, a pair of adjusting members mounted for rotation in said side members and each having a right hand threaded portion and a left hand threaded portion, each of said jaws having a pair of studs mounted for angular movement therein, the studs of the respective jaws being threaded on the right and left hand threaded portions of said adjusting members, the connection between one of each pair of studs and its jaw being such as to permit movement of the jaw longitudinally of the stud.

3. A chuck comprising in combination, a base having a pair of side members, a pair of jaws movable on said base, a pair of adjusting members mounted for rotation in said side members and each having a right hand threaded portion and a left hand threaded portion, each of said adjusting members having a pair of studs mounted thereon, each of said jaws being provided at one end thereof with a substantially cylindrical opening for the reception of a pair of said studs, and at the other end thereof with a substantially oval opening for the reception of the other pair of said studs so that the jaws may be opened to their widest extent at either end thereof.

In testimony whereof I have signed my name to this specification.

JOSEPH CASTAGNA.